Feb. 10, 1970     O. R. TITCHENAL     3,494,457

ABUSE RESISTANT BAG

Filed Aug. 5, 1968     2 Sheets-Sheet 1

INVENTOR.
Oliver R. Titchenal
BY
ATTORNEY

Feb. 10, 1970  O. R. TITCHENAL  3,494,457
ABUSE RESISTANT BAG
Filed Aug. 5, 1968  2 Sheets-Sheet 2
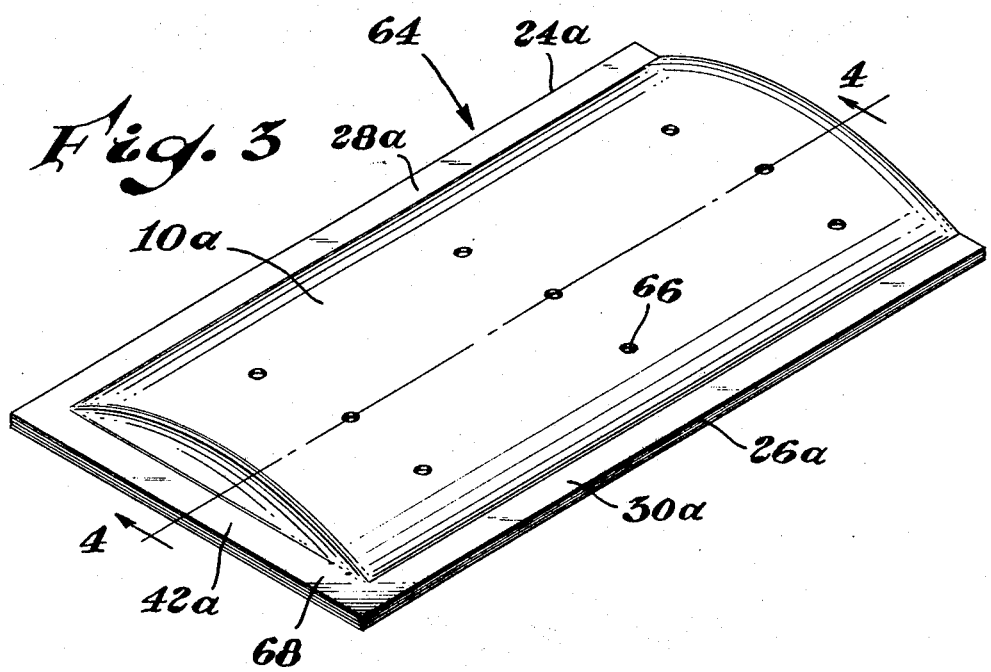
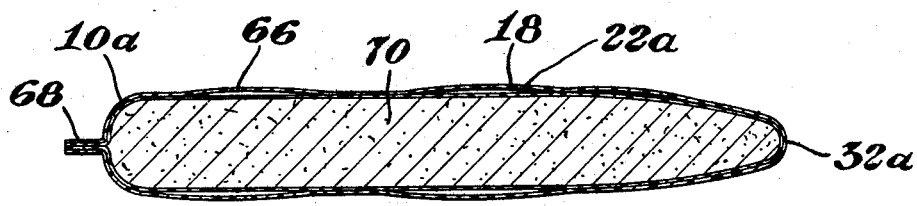
INVENTOR.
Oliver R. Titchenal
BY
*Burke M. Halldorson*
ATTORNEY United States Patent Office 3,494,457
Patented Feb. 10, 1970

3,494,457
ABUSE RESISTANT BAG
Oliver R. Titchenal, Berea, Ohio, assignor to The Dow Chemical Company, Midland, Mich., a corporation of Delaware
Filed Aug. 5, 1968, Ser. No. 750,110
Int. Cl. B65d 85/00, 33/02
U.S. Cl. 206—46
10 Claims

ABSTRACT OF THE DISCLOSURE

A double wall bag formed of inner and outer envelopes and with the finish on the facing surfaces of the two envelopes of a highly slick lubricated-like quality. The effect of such construction is to minimize abrasive damage to the inner envelope. Particular benefit is achieved in vacuum packaging applications wherein, for example, the inner envelope comprises a delicate barrier film tightly drawn about the product, and with the outer envelope loosely fitted thereover and providing a protective skin disposed about the barrier film.

DESCRIPTION OF THE INVENTION

In the packaging art it is rare to find one all-purpose film material that provides all the properties and qualities desired for a particular packaging application. It has been customary, therefore, to provide multilayered films with each layer having one or more of the composite properties desired of the total film structure. For example, where high oxygen barrier, heat sealability, and toughness characteristics are desired of the film, one can provide a multilayered film comprising an inner layer of saran (vinyl chloride/vinylidene chloride copolymer film) sandwiched between two outer layers of polyethylene. The polyethylene layers provide heat sealing and toughness characteristics while the inner saran layer is generally considered to have excellent oxygen barrier qualities. Accordingly, this composite film structure is superior to an all saran or all polyethylene film for many of the usual packaging applications employing plastic film.

It would frequently be desirable to add further layers to such film composites or at least treat one of the outer layers thereof such that a tacky or high "grip" surface quality is provided. Packages formed from such films and having high "grip" exterior surfaces, can be shipped and transported in bulk quantities and in stacked relationship to each other. Often the method of shipment is to stack a number of such packages in a large shipping container which is then transported to the retailer or ultimate user. The provision of a high grip exterior surface minimizes general shifting and moving about of the packages within the shipping container. In other words, neat stacking of these packages is better maintained.

A problem associated with such packages is their vulnerability to damage during routine shipping and handling operations. Specifically, abrasion absorbed by their high grip exterior surfaces can damage the barrier qualities of the film. Damage during shipment is especially likely since a certain amount of abrasive rubbing and jostling between the packages themselves and the shipping container must be expected as normal. The damage suffered can involve pinholes developing in the barrier layer of the package such that the effectiveness of this layer to exclude oxygen, moisture vapor or the like from the confines of the package is curtailed.

Accordingly, it is an object of the present invention to provide a bag having a high grip exterior surface, and which bag is further provided with a barrier layer so arranged as to be protected from abuses subjected on the exterior surface of the bag as, for example, during routine shipping and handling operations.

It is another object of the present invention to provide a bag having excellent palletizing or stacking characteristics plus suitable barrier qualities such that a desired internal environment can be maintained within the bag, and which bag is constructed to better retain its barrier qualities during shipping, stacking and handling.

It is still a further object of the present invention to provide a double wall bag wherein the facing surfaces between the inner and outer envelopes comprising the bag beneficially include designed-in slickness qualities.

It is yet another object of the present invention to provide such bags as embodied in a vacuum package wherein the inner envelope is tightly vacuum drawn about the product, and with the outer envelope loosely fitted over the inner envelope to shield the same from punishment.

Briefly then, the present invention contemplates an improved double wall bag construction wherein the bag generally includes inner and outer envelopes forming inner and outer walls. Beneficially, the outer envelope is provided with a high grip exterior surface finish to improve stacking characteristics, and is formed of a tough packaging material suitable for withstanding the usual punishments expected in routine shipping and handling operations. The inner envelope normally comprises a barrier material or film selected to maintain a beneficial product environment within the confines of the bag. The finish on the facing surfaces of the two envelopes is of a highly slick, lubricated-like quality such that the envelopes are able to smoothly slide or shift in relation to each other. By this means, the outer envelope forms a tough, loose fitting skin about the inner envelope, whereby damage to the barrier qualities of the inner envelope by abuse, impacts, or the like, is effectively minimized.

Yet additional objects and advantages of the present invention, and its numerous and cognate benefits are even more apparent and manifest in and by the esuing description and specification taken in conjunction with the accompanying drawings, in which wheresoever possible, like characters of reference designate corresponding material and parts throughout the several views thereof in which:

FIGURE 3 shows an isometric view of a vacuum package constructed according to the principles of the present invention; and FIGURE 4 is a cross-sectional view of the vacuum package of FIGURE 1 taken along reference line 4—4 thereon.

Figure 1:
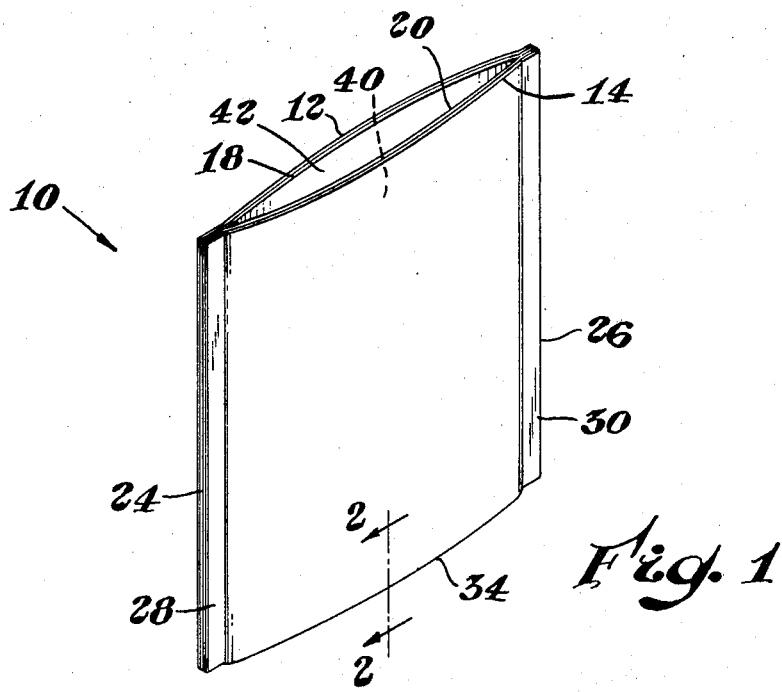
FIGURE 1 shows an isometric view of a double wall bag constructed according to the principles of the present invention.

Referring to FIGURE 1, there is shown a double wall bag 10 of a basic construction including outer front and rear walls 12 and 14 forming an outer envelope 16, and inner front and rear walls 18 and 20 forming an inner envelope 22.

The four plies comprising walls 12 and 14 and 18 and 20 are edgewise joined together along the sides 24 and 26 of bag 10 by unitary seams 28 and 30. Seams 28 and 30 can be formed by the well known heat sealing techniques where the facing surfaces of the four plies to be secured comprise compatible thermoplastic materials, or by suitable solvents, adhesives or the like as would be appropriate for the materials involved.

Figure 2:
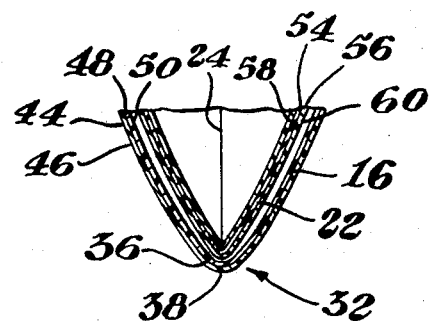
FIGURE 2 is an enlarged cross-sectional view of the bag of FIGURE 1 taken along the reference line 2—2 thereon.

A double fold construction 32 extends across the bottom or first end 34 of bag 10 closing the same as is best illustrated in FIGURE 2. Double fold construction 32 includes an inner fold 36 and an outer fold 38. Inner fold 36 joins together the two inner walls 18 and 20 of bag 10, while the outer fold 38 joins together the two outer walls 12 and 14.

Bag 10 further includes a fill opening or mouth 40 extending across the top of second end 42 thereof and along which the four plies comprising the walls of the bag 10 remain unsecured.

An important part of the inventive concept disclosed herein resides in selecting particular surface finishes for envelopes 16 and 22 whereby a double wall bag, such as bag 10, is provided with inherent resistance to abuse and punishment, as well as superior characteristics as concerns the stacking and handling abilities of the bag. Such finishes can be provided by suitable surface treatments, as for example, by applying lubricants to obtain slickness, and/or by employing laminated layers of materials with the surface layers of the laminate selected so as to provide the different finishes desired.

The latter method represents the preferred embodiment of the present invention wherein, for example, the outer envelope 16 is formed of a two-layered laminate structure comprising a first or exterior layer 44 which forms the exterior surface 46 of bag 10 and which is joined together in intimately bonded relationship with a second or interior layer 48. Generally and without reference to specific materials which is reserved for a more detailed discussion hereinafter, the first layer 44 provides a high grip or, in other words, a non-skid exterior surface 46 whereby bag 10 after filling can be stacked and handled with relative ease. In contrast, the second layer 48, which forms the interior surface 50 of outer envelope 16, is selected from those materials having a generally slick or lubricated-like surface quality.

For the inner envelope 22 there is provided a three-layered laminate structure comprising a barrier layer 54 sandwiched between and in intimately joined realtionship with, first and second inner wall or envelope layers 56 and 58. The exposed surface 60 of the first inner envelope layer 56 faces the interior surface 50 of the outer envelope 16, and is of a similar quality thereto, that is, one that is relatively slick or lubricated-like such that these two facing surfaces tend to smoothly shift or slide upon each other, and with a minimum of frictional resistance.

Considering now the details of the present invention the first layer 44 of the outer envelope 16 is beneficially selected to provide a grip measurement for surface 46 of at least 50° as determined by a conventional slip angle test. In this test the slip angle is determined by stretching the sheet of material to be evaluated (layer 44) on a flat horizontally disposed surface, securing the material to the surface, overwrapping a block weighing one pound and having a rectangular face measuring 2 x 2 inches with another portion of material to be tested (again, layer 44), placing the covered 2 x 2 inch surface of the block in engagement with a portion of the film secured to the flat surface, subsequently raising one end of the flat surface to cause the surface of the block to assume an increase in angle with respect to the horizontal, and determining the angle of the flat surface to the horizontal at the time when the block commences to slide or move.

Exemplary of materials which can be endowed with the slip described above and which are eminently suited for the first layer 44 include those materials comprised primarily of polyethylene, ethylene/vinyl acetate copolymers, ethylene/ethyl acrylate copolymers, ethylene/acrylic acid copolymers including random and graft copolymers thereof, certain plasticized polyvinyl chlorides, as well as many other extrudable synthetic resinous compositions. When polyethylene is employed, it would normally be without the otherwise customary added slip additives which are normally added to polyethylene formulation.

Particularly advantageous for the preparation of such films as are used for the first layer 44 of bag 10 is a polymeric material obtained by chlorination of essentially linear finely divided polyethylene or interpolymers containing at least 90 mole percent of ethylene in the polymer molecule. Specific examples of these materials and their methods of preparation are explained in some detail in U.S. patent application Ser. No. 629,042, filed Jan. 30, 1967, now U.S. Patent No. 3,396,901.

Layers 48 and 56 which form the facing surfaces 50 and 60 of envelopes 16 and 22, respectively, provide the same with a slip measurement in the range of about 25 degrees or less as determined by the above slip angle test, but with the exception that if two different materials are involved, one would be wrapped on the block and the other secured to the flat surface. Most beneficially the slip angle is less than 20 degrees with the optimum range being from about 5 to about 15 degrees. Obtaining a material with a slip angle of less than about 5 degrees presents difficulties. Normally, at slip angles of more than about 25 degrees, the amount of frictional or sliding resistance between the facing surfaces 50 and 60 becomes objectionable. A further advantageous requirement for surfaces 50 and 60 is that they be formed of compatible materials, that is, materials that can be fused together by applications of heat and pressure. This latter requirement would be especially beneficial in those instances where the forming of seams 28 and 30 by heat techniques is most practical and efficient.

For example only, materials answering these requirements are set out with particularity in the following table. These composition can be prepared by any method suitable for insuring a uniform mixture of the components of the composition such as, by mixing the polyethylene and additives at a temperature at which the polyethylene is plastic. Mixing, for example, can be performed by employing a Banbury mixer, a conventional rubber mill, heated rollers, an extruder screw or the like. The additives can be blended in the form of a solid or a liquid (depending upon the temperature), a solution in an inert solvent, or a slurry in a non-solvent.

TABLE—POLYETHYLENE COMPOSITION

| | Additive material kind | P.p.m. | Slip angle in degrees |
| --- | --- | --- | --- |
| 1 | N-ethanol stearamide | 1,000 | 20 |
| 2 | Erucylamide | 1,000 | 10 |
| 3 | do | 3,000 | 10 |
| 4 | Oleamide | 1,000 | 17 |
| 5 | do | 3,000 | 10 |
| 6 | do | 5,000 | 9 |
| 7 | do | 500 | |
| | Calcium carbonate | 1,000 | 11 |
| 8 | Oleamide | 3,000 | |
| | Calcium carbonate | 1,500 | 10 |

From the above table it can be observed that Examples 2, 3 and 5 through 9 provide especially slick surface qualities with slippage commencing at elevations of from about 9 to about 11 degrees. Such levels of slickness can be especially beneficial in heavy duty applications as, for example, in packaging 50 lb. lots of fertilizer, talc and like products, wherein rough handling and abuse can be expected as normal. Since many of these products are frequently hydroscopic in nature, that is, they tend to absorb moisture vapor from the air and cake, the maintenance of the moisture vapor barrier qualities of the package is of special importance. A double wall bag employing the abuse-resistant concept of the present invention is accordingly highly useful in such packaging applications.

The barrier layer 54 is selected according to the requirements of the product packaged within the bag whereby the barrier layer allows a particular internal environment beneficial to the product, to be maintained within the confines of the bag. For products such as ground coffee, peanuts, cheese and the like, exclusion of oxygen from the confines of the bag by means of a suitable oxygen barrier, for example, a vinylidene chloride/vinylchloride copolymer layer 54, is a highly effective method of preventing product decay. However, as a moisture vapor barrier, the polyethylene compositions of the above table would frequently meet the requirements as to the levels of barrier qualities needed, which level, of course, is determined by the product to be packaged and the package specifications. Thus, it is conceivable that the inner envelope 22 would often desirably be formed of only a single layer material as, for example, when packaging moisture absorbing or hydroscopic products, whereby the material selected is able to provide both a suitable moisture vapor barrier and the lubricated-like surface qualities desired of the inner envelope.

The second inner wall layer 58 which sandwiches barrier layer 54, would normally be employed only in those instances where the heat sealing characteristics of the barrier layer 54 are lacking and where heat sealing is desired to form seams 28 and 30. However, such a layer does also provide some internal protection for the barrier layer 54 and might be desired for that reason as well. Accordingly, a tough biaxially orientated polyethylene film can be used to form the inner wall layer 56 whereby both of the above beneficial objects can be realized.

Briefly then, bags constructed according to the above principles provide both superior stacking and handling characteristics as well as improved resistance to abuse. Specifically, a balance is provided between the high grip exterior surface 46 of bag 10 and the slickness qualities of the facing surfaces 50 and 60 with the balance being at least at a two to one ratio (i.e. the facing surfaces 50 and 60 having a slip angle of 25 degrees in combination with an exterior surface 46 having a slip angle of 50 degrees). This balance provides for the outer envelope 16 to absorb a substantial portion of the punishment incurred during routine shipping and handling operations, while at the same time smoothly sliding over the inner envelope 22 to protect the same from abrasive damage. This is of particular benefit to bags of this type since their high grip exterior surface 46 finish is one that tends toward maximizing the effect of impacts upon bag 10. For instance, upon receiving an abrasive-like impact, these high grip surfaces are likely to adsorb considerable amounts of punishment since they are such as to tend to grip the impacting or abrading object. By means of the present invention, however, bags having superior stacking and handling characteristics can be provided and can include a barrier layer in effect insulated from the inherent punishment adsorbing characteristics of the high grip exterior surfaces of such bags.

FIGURES 3 and 4 illustrate the present invention as embodied in a particularly advantageous vacuum package form. Accordingly, there is shown a vacuum package 64 comprising a double wall bag 10a, with bag 10a being constructed generally like bag 10. Thus bag 10a includes inner and outer envelopes 22a and 16a with the four plies comprising the two envelopes being edgewise sealed together along the sides 24a and 26a of the bag by seams 28a and 30a. Likewise, the bottom end 34a of bag 10a is closed by a double fold construction 32a as is best shown in FIGURE 4.

The previously mentioned surface qualities of the two envelopes comprising bag 10a can be obtained by suitable surface treatments and the like and/or as discussed above by employing a multi-wall construction with detailed reference to the latter being shown in FIGURE 2, and with FIGURES 3 and 4 omitting the detail of multi-layer construction for simplicity in presenting the disclosure of the present invention.

As an added feature not shown in bag 10, the outer envelope 16a of bag 10a is provided with a plurality of spaced holes of apertures 66 for purposes that will become more clear in the description of package 64 which follows.

Package 64 can be for ground coffee, nuts, cheese, luncheon meat, and the like products as depicted generally by reference numeral 70, and which benefit from being contained in a vacuum environment. Such products can be placed with the confines of bag 10a by the usual filling techniques as, for example, by hand filling of bag 10a, or by the conventional machine filling methods which are well known to the art. Vacuumization of package 64 can be had by filling and sealing the package in a sealed vacuum chamber, or by other suitable vacuumizing techniques such as by the insertion of a hollow needle into the package and the drawing of the vacuum therethrough followed by a patching or sealing step. For an example of the last mentioned method, reference can be had to U.S. Patent Nos. 2,606,704; and 2,888,788. A gas flush of the package can accompany or be substituted for the vacuumizing operations if desired.

In any event, after filling, the mouth of bag 10a is sealed closed as, for example, by a heat seal 68 securing together the four plies of envelopes 16a and 22a across the top end 42a of bag 10a, with the sealing being effected either concurrently with or prior to vacuumizing operations as would be appropriate for the vacuumizing technique employed.

With the vacuumizing of package 10a, the inner envelope 22a is drawn tightly about the product 70 whereby the outer envelope 18a forms a loose fitting skin protectively surrounding the tightly drawn inner envelope, as is best illustrated in FIGURE 4. More specifically, apertures 66 allow any excess or residual air or gas located between the two envelopes 16a and 22a to escape into the atmosphere whereby a bloating or inflation of the outer envelope is avoided. As can be readily appreciated, the loose fitting skin formed by the outer envelope 16a provides an especially effective shield for the inner envelope 22a with relative movement and shifting between these two envelopes being particularly facilitated.

The multi-layered films forming the separate envelopes described herein for envelopes 18 and 22 can be prepared by methods well known in the art, including hot lamination with adhesive if necessary, extrusion lamination, simultaneous extrusion as set forth in British Patent 985,310 and Italian Patent 522,838. Also, for example, the usual coating techniques can be employed to form at least one on the layers comprising the inner and outer envelope of bag 10 as, for example, to provide the high grip surface 46 desired of outer envelope walls 16 of bag 10.

While certain representative embodiments and details have been shown for the purpose of illustrating the invention, it will be apparent to those skilled in the art that various changes and modifications can be made therein without departing from the spirit and scope of the invention.

Accordingly what is claimed as new is:

1. An abuse resistant bag comprising inner and outer envelopes, the inner envelope being located generally within the outer envelope such that said envelopes form facing surfaces, said outer envelope forming the exterior surface of said bag, said exterior surface having a slip angle at least twice as great as that of said facing surfaces.

2. The bag of claim 1 wherein the slip angle of said exterior surface is at least 50 degrees.

3. The bag of claim 1 wherein the slip angle of said facing surfaces is less than about 20 degrees.

4. The bag of claim 1 wherein the slip angle of said facing surfaces is in the range of about 5 to about 15 degrees.

5. An abuse resistant package comprising inner and outer envelopes, a product hermetically secured within the confines of said inner envelope, said outer envelope disposed about said inner envelope such that said envelopes form facing surfaces, said outer envelope comprising the exterior surface of said package, the slip angle of said exterior surface being at least twice as great as the slip angle of said facing surfaces.

6. The package of claim 5 wherein the slip angle of said exterior surface is at least 50 degrees.

7. The package of claim 5 wherein the slip angle of said facing surface is less than about 20 degrees.

8. The package of claim 5 wherein the slip angle of said facing surface is in the range of about 5 to about 15 degrees.

9. The package of claim 5 wherein said inner envelope is tightly fitted about said product, and said outer envelope forms a relatively loose fitting skin disposed about said inner envelope.

10. The package of claim 9 wherein said outer envelope includes at least one aperture communicating between the atmosphere surrounding said package and the space between said inner and outer envelopes.

References Cited

UNITED STATES PATENTS 3,248,840   4/1966   Friedman _____ 229—55

JAMES B. MARBERT, Primary Examiner

U.S. Cl. X.R.

229—55